United States Patent
Kennedy

(10) Patent No.: US 8,312,113 B2
(45) Date of Patent: Nov. 13, 2012

(54) MANAGING SHELL CONFIGURATIONS TO DYNAMICALLY CONTROL USER COMPUTING ENVIRONMENTS

(75) Inventor: John W. Kennedy, Glendora, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1286 days.

(21) Appl. No.: 12/035,333

(22) Filed: Feb. 21, 2008

(65) Prior Publication Data

US 2009/0216869 A1    Aug. 27, 2009

(51) Int. Cl.
G06F 15/177 (2006.01)
G06F 3/00 (2006.01)
(52) U.S. Cl. .................................. 709/220; 715/700
(58) Field of Classification Search .................. None
See application file for complete search history.

(56) References Cited

U.S. PATENT DOCUMENTS

| | | | |
|---|---|---|---|
| 4,744,048 A * | 5/1988 | Blanset et al. | 715/806 |
| 6,871,221 B1 | 3/2005 | Styles | |
| 6,976,063 B1 | 12/2005 | Dharmarajan et al. | |
| 2005/0273758 A1 * | 12/2005 | Long | 717/101 |

OTHER PUBLICATIONS

Shells: User's Guide HP 9000 computers, Hewlett Packard, HP Part No. B2355-90046, Aug. 1992, Second Edition E0892.

* cited by examiner

Primary Examiner — Scott Christensen
(74) Attorney, Agent, or Firm — Marsh Fischmann & Breyfogle, LLP; Kent A. Lembke

(57) ABSTRACT

A method for managing a user's computing environment on their computer or workstation. The method includes storing a set of files in a memory device accessible via a communications network. Each file includes data such as environment variable values defining a particular computing environment. The method includes providing an environment management engine in a user's home directory of a computer. A shell runs in the computer device to invoke and run a computing environment management engine within the shell. The engine generates a computing environment in the computer based on the computing environment definition in one of the files that is chosen based on a user-provided or otherwise determined job state (e.g., the user is working on a project or a portion of a project that is associated with a job state). The computing environment includes versions of software applications, path variables, and alias definitions.

15 Claims, 8 Drawing Sheets

MANAGING SHELL CONFIGURATIONS TO DYNAMICALLY CONTROL USER COMPUTING ENVIRONMENTS

BACKGROUND OF THE INVENTION

1. Field of the Invention

The present invention relates, in general, to computer operating and/or processing environments, and, more particularly, to systems and methods for configuring users' computing environments to control resources that are made available to each user of a client node or networked computer such as applications and other tools, memory, networked devices, and the like.

2. Relevant Background

In a typical workplace, employees begin their day by powering on their computer workstation. The computer's operating system boots up and requests each employee or computer user to enter log in information. The operating system then acts to configure the computer workstation to provide the user a computing or processing environment. The computer workstation may be considered a client or node as nearly all computer workstations are now communicatively linked via a network (e.g., are based on client-server topologies) to a variety of computing resources such as servers that act to serve tools such as applications including word processing packages, Internet navigation tools, graphics packages, and the like.

An ongoing challenge for information technology (IT) professionals and network administrators is how best to manage users' computing environment to best meet the needs of the user as well as the employer or other entity providing the user access to the networked resources. In many cases, a network administrator has to set up for each user what shared applications the user will have access to, defining desktop layout and security settings, and other client device configurations. Some computing settings are suited for simply defining a computing environment initially for each user and then periodically to reflect changes in network resources such as with the use of logon scripts or the like. However, there are many situations in which it is desirable to be able to more dynamically manage users' computing environments to more tightly control the resources made available to particular users (such as which applications are accessible and even which versions of such applications are available to the users) and to allow users to operate one or more computer workstations or network clients in multiple computing environments (such as to allow users to work on differing projects or to access digital assets according to their current role).

Multiple computing environments may be desirable when managing and accessing digital assets such as those created for animation, computer games, and Web site development. For example, in producing animation such as a film, the animation pipeline relies on a comprehensive database that stores files holding various versions of shots that are combined into sequences, which are in turn combined to form the show or film. Each shot may have multiple versions, and it is important for an artist or animator to be able to quickly access a particular version such as the most current version of a shot rather than an out of date version. Managing or organizing such a large number of digital assets can be a logistics nightmare, and animators and others trying to access and use the assets are often frustrated. Often, animators and other contributors will be assigned to multiple projects such as a number of digital film productions simultaneously. Each of these projects may use differing tools such as differing graphics programs or differing versions of the same programs. Hence, it is important that these users or contributors work in a particular computing environment each time they access a particular set of digital assets, e.g., file compatibility and other issues may arise if an animator creates a shot with a particular version of a graphics tool and then later modifies the shot with a differing version of the graphics tool or with another graphics tool.

Historically, network administrators have tried to address the problems associated with managing users' computing environments by inputting environment definition information to each user's shell. A shell may generally be thought of as a computer program or routine in Linux, Unix, C, or other programming languages that provides an interface between a user and a computer system, and, more typically, a shell is considered a software interface between the user and operating system in which the shell interprets commands and communicates them to the operating system of the computer. In the past, network administrators have used routines (e.g., a Perl, a Python, or other programming language routine) that are run and/or called external to the shell to define the computing environment information or settings and then to produce a shell script or a file that it passed to the shell to cause the shell to execute a number of commands or actions to define a user's computing environment based on these passed environmental settings. For example, a simple list of environments may be stored in memory, and a program external to the shell is called to read from the environment list to select an appropriate one for a particular user during establishment of a computing environment. The external program would then write a separate script for the chosen environment and pass this script to the shell for execution (e.g., a file containing a Perl, Python, or other language program is sent to the shell). In some cases, launching subprocesses to define the computing environment has hindered performance and/or caused an undesired delay in creating the environment and has resulted in increased memory usage. Also, existing techniques of managing computing environment have not provided a desired level of control for administrators in managing available environments (e.g., issues with managing the environment list).

Hence, there remains a need for improved methods and systems of managing user computer environments such as for users accessing computer resources via a digital communications network such as a local area network (LAN), a wide area network (WAN), or the like. Preferably, such methods and systems would be adapted to support the digital film industry and similar industries in which each user may need to work in two or more computing environments such as to support two or more work projects that utilize differing tool sets or computer resources.

SUMMARY OF THE INVENTION

The present invention addresses the above problems by providing methods and systems for managing the computing environment of users of client nodes or computer workstations accessing a number of networked resources. Some embodiments of these methods are well-suited to supporting a number of digital film productions that each may utilize two or more computing environments (or shell environments) that are each defined, at least in part, by a number of discrete shell configuration settings (or environment variables). The method may be thought of as a method for managing an arbitrary number of shell environments and may be adapted to permit individual users to select a computing environment for their client node or workstation and the selected computing environment is used to control the shell configuration of their user account on the fly or dynamically, without requiring the user to have knowledge of the shell syntax or environment convention.

The method may utilize an engine or user shell configuration manager labeled herein as a recursive execution dynamic environment (REDE) engine that is provided in a file in the user's directory and called internally by the shell. The REDE engine evolved as a platform-agnostic native language method for managing the environment settings of a shell (e.g., the C-shell provided with use of LINUX, BSD, MacOSX, or similar operating systems). Use in some embodiments of a native scripting language and a recursion-based implementation of the REDE engine allowed the environment management method to be performed within a computer such that all (or substantially all) processing occurs in the invoking shell layer and, therefore, allows for direct manipulation of the shell environment settings without requiring use of an external subprocess or command interpreters as was the case with prior management techniques. An array of environment definitions (with a set of environment variables associated with each environment definition) that is stored in memory and accessible by the client node or workstation permits simple and swift control with the REDE engine of some or all of the shell resources (or computing resources) including, but not limited to, software or applications, versions of such software or applications, file system references, license specifications, tuning parameters for subordinate software facilities, and/or other resources.

The REDE engine in some embodiments is provided as a self-contained, self-referencing suite of integrated shell command functions that allow a user's shell or user account to apply and edit shell configuration settings with a nearly unlimited number of permutations of such settings to define computing environments. It can be used to manage the environment of a single user or, more typically, is applied by an administrator to manage resource usage in multi-user organizations. The REDE engine provides an ability to define user environments in some cases as a hierarchy modeled on a directory construct, to enable a suite of dynamically-defined, file system navigation tools to be included, which, in turn, enables the traversal of storage systems coincident with simultaneous dynamic environment resource management. These environment management functions are in most embodiments accomplished without intruding on the shell convention that allows individual users to employ custom configuration resource files.

Prior management techniques did not provide a program or engine that was integrated into the shell or shell layer of a computer and often were excessively complex and caused performance degradation. Further, these prior techniques often used a non-native, interpreted language that introduced external dependencies and limited extensibility of the management tool. Additionally, prior management techniques often required esoteric modifications of a user's personal resource file(s) or ignored accepted conventions by co-opting this file(s). In contrast, methods described herein using the REDE engine are more efficient, are readily adaptable, are generally compatible, and are typically less subject to considerations associated with external dependencies. Further, embodiments of the REDE engine may be configured to adhere relatively closely to conventions for shell management and, significantly, to facilitate enhanced management of multiple user environments within the shell user regime.

More particularly, a method is provided for managing a user's computing environment on their computer or workstation. The method includes storing a set of files in a memory device that is linked to or accessible via a communications network. Each of these files includes data useful for defining a particular computing environment, and, in some embodiments, these files may be an array of environmental definitions or variable values with each file representing a master environment index file (e.g., a file with environment settings for a particular job or project). The method further includes providing an environment management engine (e.g., a REDE engine) in a user home directory of a computer device (e.g., the user's workstation, laptop/notebook, or other computing or electronic device). A processor is operated to run a shell in the computer device, and the shell determines if the environment management engine is present in the home directory, and, if so, it is invoked and run within the shell. The environment management engine runs or operates to generate a computing environment in the computer device based on the data defining a computing environment found in one of the files in the network accessible memory device.

In some embodiments, the computing environment includes a set of applications and is further defined by a set of path variables and alias definitions. Each of these applications may be a particular version of a software tool or program. The environment management or REDE engine may operate to determine a job state for the computer and the engine may select the file from the memory device based on this job state such that the computing environment generated is linked to or corresponds to the job state. The job state typically is provided by or selected by a user (e.g., via operation of a user input device such as a keyboard, a mouse, or the like). The method may further include operating the shell (or the engine within the shell) to receive a change of state command including a job state name to switch to, and the performing of the change state command may include causing the shell to access the memory device to obtain another one of the files (or at least accessing the environment settings found therein) corresponding to the job state name. The shell may then use the engine to generate a new computing environment in the computer device based on the data found in this accessed file (e.g., accessed master index file). In some embodiments, the data defining the computing environment includes a set of environment variables (such as applications and their versions, path variables/settings, alias values, and the like) and, further, all or at least a portion of the files are arranged in a hierarchical manner or architecture with parent-child relationships such that child or lower tier/level files inherit values for environment variables from their parent files (e.g., parent job state).

DETAILED DESCRIPTION OF THE PREFERRED EMBODIMENTS

Figure 1A:
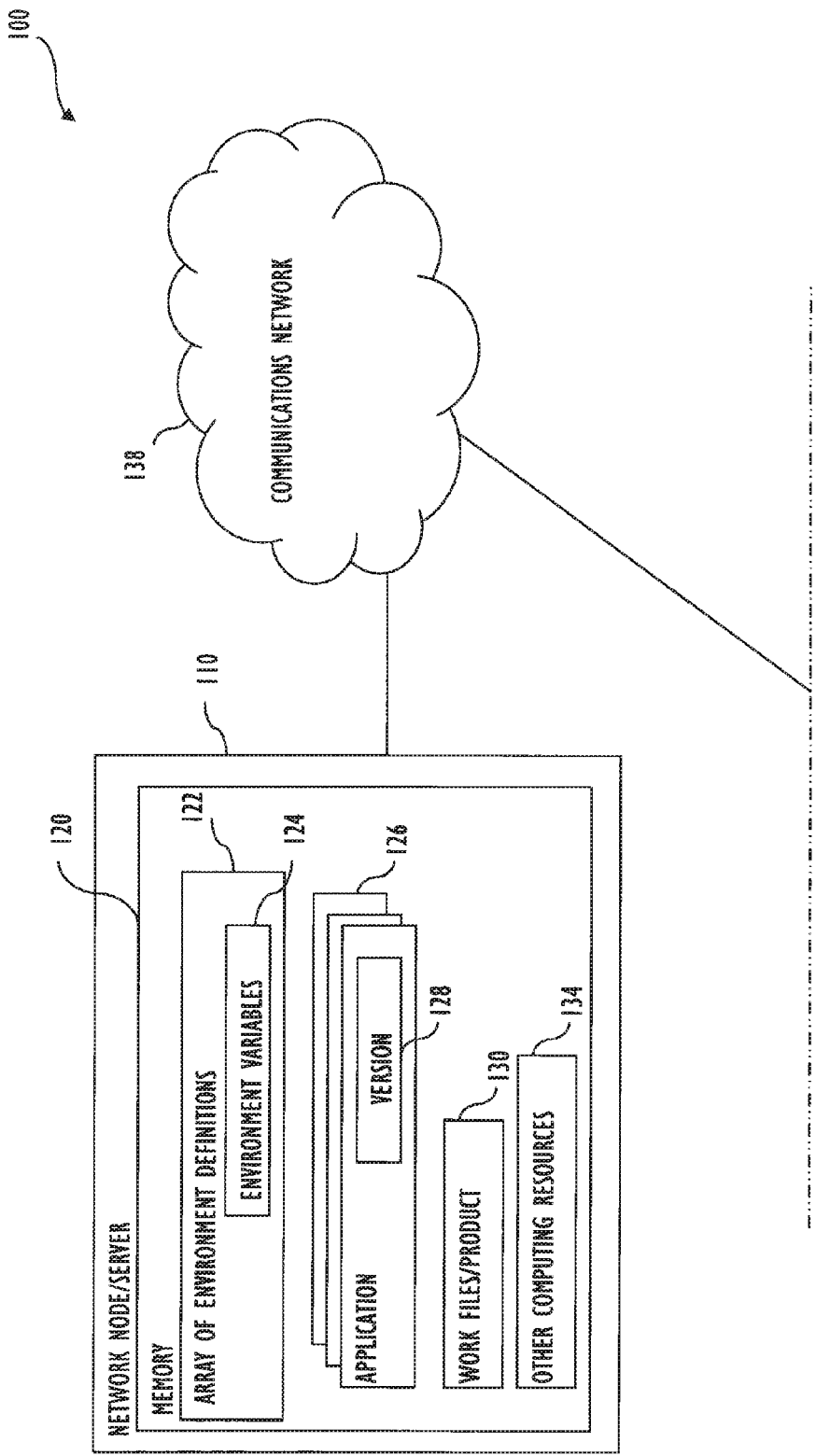
FIGS. 1A and 1B are a functional block diagram of a computer or network system of one embodiment of the invention for managing user computing environments in a dynamic manner via the user shell.

Briefly, embodiments of the present invention are directed to methods and systems for managing the computing environment of users in a computer system such as the computing environment provided to users of client devices or workstations in a networked arrangement. The following examples and description are somewhat tailored to use in the digital film industry such as for allowing a user, such as an animator or others working with digital assets of an animated work, to select a work environment for use in performing a particular task that, in turn, may be related to a particular project or production or even to a process or step in the production pipeline within such a particular project or product (e.g., the work or computing environment is tied to or linked to a job state indicating the project or subtier or lower hierarchical level of such project).

The computing environment generally is created dynamically in some embodiments by a shell operating to invoke an environment management engine (or REDE engine) to operate recursively within or integral to the shell. The REDE engine or REDE shell layer then acts to determine the user's current job state (e.g., by a user selecting or indicating their job state), to determine proper environment settings for that job state (e.g., by accessing an array of environmental definitions using the job state), and to generate a computing environment based on the environment settings for the job state. In this manner, the methods and systems of the invention enable a user to efficiently select and change between computing environments with an assurance that the applications, tools, and other computing resources will be selected and configured appropriately for a particular job state or task (e.g., the appropriate set of programs or applications will be accessible in the environment and will be of the appropriate version and/or the like).

The following description provides examples of particular operating systems and shells and computing devices and resources. However, it will be understood that these are only representative examples of useful implementations of the invention and not as limitations to its breadth. Further, embodiments of the invention may be thought of generally as a computer-based method for managing a user's environment while they are operating a client device, a network device, a workstation, or other computer or computing device, and the particular software, firmware, and/or hardware used to implement this method are also not limiting of the invention. In general, the algorithms, routines, and processes described herein may be implemented upon nearly any computer-readable medium that can cause a computer or computer system to perform a corresponding function. For example, the REDE engine or REDE engine file may be provided as software or programming code for causing a shell to perform particular functions as part of creating a user's computing environment and may be stored on a memory device of a client node (e.g., in the user's home directory on the computer's hard disk or the like), computer, or workstation that uses one or more processors or CPUs to run the software. The workstation likely will include a number of input/output devices (I/O devices) such as a keyboard, a mouse or trackball or the like, a touchscreen or pad, a voice recognition mechanism, and the like. A monitor or monitors will also be provided to allow the user to view one or more user interfaces (such as windows created as part of the computing environment to view and/or access job state, shell environment settings, and the like). The user interfaces may be nearly any combination of menus, screen designs, keyboard commands, command language, and the like (including in some cases mice, touch screens, and other input hardware such as voice recognition) to allow a user to interact with a computer and with digital assets stored in memory in a particular computing environment. The invention may also be implemented using one or more data servers that may communicate with the workstations over a digital communications network such as the Internet, a local area network, a wide area network, or the like using any of a number of well-known or later developed communications protocols (wired or wireless), and the browsers and related applications may be provided as web applications accessible in particular computing environments.

Figure 1B:
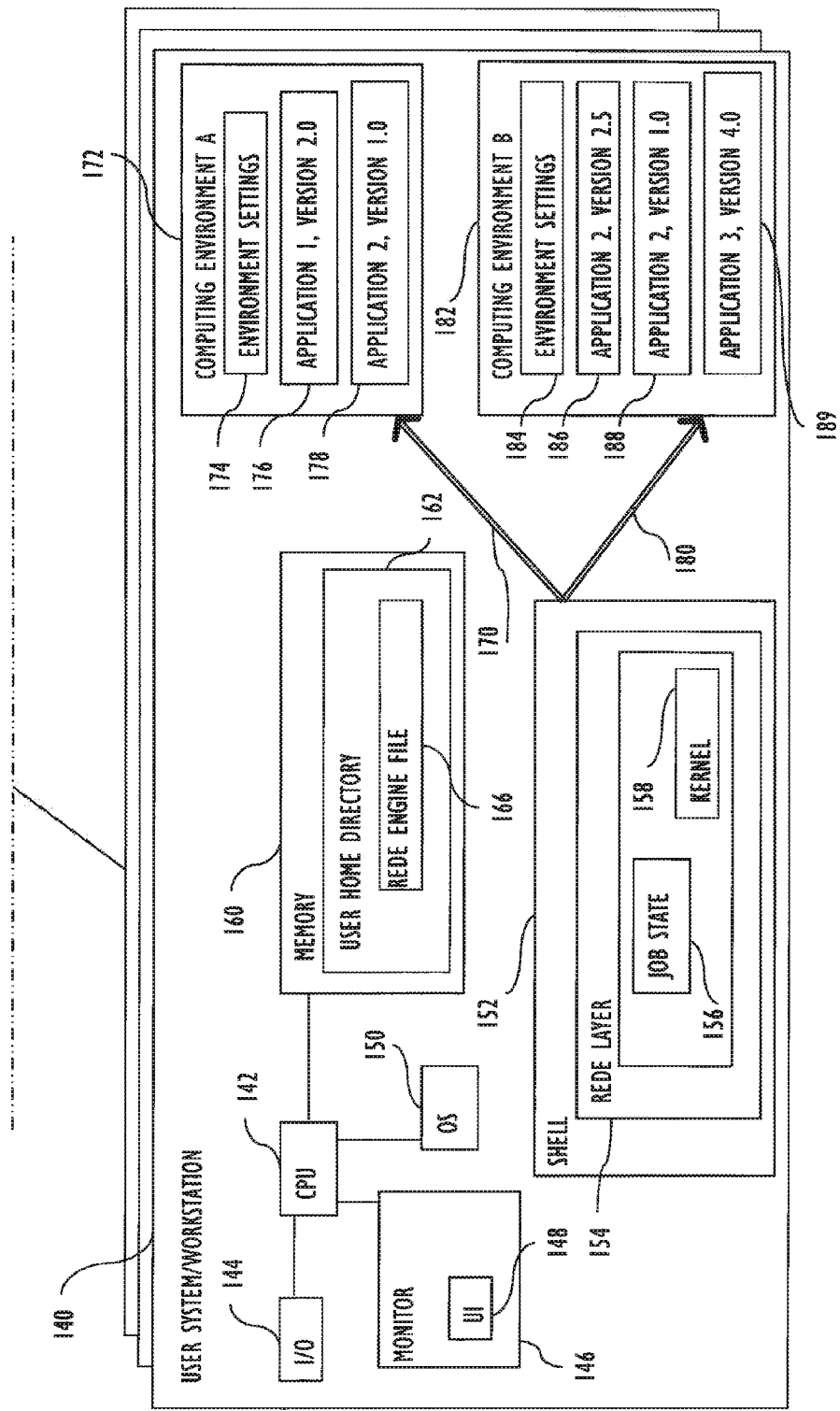

FIGS. 1A and 1B illustrate a functional block diagram of a user environment management system 100 of one embodiment of the invention. The system 100 is shown in a relatively simplistic manner but is intended to be illustrative of a typical computer network used by entities such as businesses to allow user's or worker's to operate a computer or workstation in one location, such as their office, while accessing a number of shared computing resources. While operating a client device or workstation, the user may elect to work in a particular computing environment that may include use of one or more applications or programs (and particular versions of such applications) as well as other settings (such as paths to accessing resources and storing data and as aliases for commands/routines).

As shown, the system 100 includes a network node or server 110 (with only one being shown for ease of discussion while more than one device may be used to practice the invention). The server 110 is communicatively linked to a digital communications network 138 such that it can serve or make accessible a variety of information and computing resources. As shown, the server 110 includes memory or data store 120 that stores an array of environmental definitions 122 that each may have a set of values or settings for environment variable 124 used by a shell in creating or defining a user computing environment. In some cases, the array 122 is accessible or searchable by user systems 140 over network 138 with a job state or other identifier of a user-selected or, alternatively, a process-determinate computing environment. The server 110 further provides applications, programs, or tools 126 each having a particular version 128 (e.g., multiple versions of a single application such as a graphics package, an animation tool, an editing routine, or the like may be stored in memory 120). Work files, product, and/or digital assets 130 may be stored on server 110 such as in a particular path defined by a computing environment. Additionally, other computing resources 134 may be served over network 138 by network node 110.

The system 100 further includes one or more user systems or workstations 140 (e.g., thin clients, personal computers (PCs), PDAs, notebook computers, and the like). The user system 140 includes a processor or CPU 142 that controls or runs an operating system 150 as well as input/output devices 144 (such as keyboards, touch screens, mice, voice recognition programs, and the like), monitor 146 displaying a user interface or GUI 148 and memory 160. The user system 140 is shown to have a shell 152 providing an interface between the user of the system 140 and the operating system 150, and the shell 152 operates to interpret commands and communicates them to the operating system 150. The shell 152 is provided about the kernel 158 of the user system 140. The shell 152 is shown to be a REDE shell in that it includes a REDE layer 154 integral or within the shell 152 (although the REDE layer 154 may also be thought of as wrapping about the shell 152 to be between the OS 150 and the shell 152). The REDE layer 154 is created by the shell 152 accessing the user's home directory 162 to determine if a REDE engine file 166 is present and, if so, invoking or running this routine or program (e.g., script of executable commands).

As part of the shell 152 invoking the REDE layer 154 the shell 152 acts to determine a job state or environment selection value 156. This value will be explained in detail below, but, for now, it is worth indicating that this may be a value determined based on navigation by a user via I/O 144 or UI 148 or it may involve the user choosing a job state 156 to work in with the system 140 (e.g., a shot for a particular job or production in the case of a digital or animated film or work). The shell 152 then acts to generate (as shown with arrow 170) a computing environment 172, and the computing environment 172 is established or defined by environment settings 174 and resources such as applications 176, 178. The environment 172 is created 170 by the shell 152 (or REDE layer 154) accessing the array of environment definitions 122 and retrieving a particular definition and its associated environment variables or setting values 124 based on the job state 156 determined by or assigned to the shell 152.

As will be explained in detail below, the user may decide to change their environment such as to begin work on a differing job or project or a particular subset or subtier of the job or project (e.g., a particular shot or sequence within an overall film or work). This may be done by changing the value of job state 156 such as by entering a change request, by navigating in the UI 148, or by other techniques. The shell 152 responds on-the-fly or dynamically to create or establish as shown with arrow 180 another computing environment 182. This environment 182 may be the same as environment 172 but simply be associated with a different job state value 156. More typically, as shown, the second computing environment 182 will have a unique set of environment settings 184 (e.g., not equal to environment settings 174) and are set or defined by the shell 152 by accessing the array of environment definitions 122 over network 138 with the new job state 156. The environment 182 may include the same applications but in these instantiations 186, 188 the version may be differ as shown for application 186 contrasted to application 176 (or be the same version as shown with application 188 contrasted to application 178). Also, the second computing environment 182 may differ by including additional computing resources, use differing search paths, or aliases, and in a simple manner, this is shown by inclusion of an additional application 189 not provided or accessed in environment 172.

Although not shown, the system 100 typically will also include an administrator system, which may be similar to system 140, that is linked to network 138. An administrator may operate such a system to access the array 122 to initially store or define environments for sets of users (e.g., use a GUI or the like to access and change environment variables 124). The administrator may also access or operate systems 140 to install the REDE engine file 166 in the home directory 162 of one or more of the users under their administration. For example, an administrator may establish a shell for a plurality of projects (or shows in the animated film setting). The users may then be assigned to one or more of these shows or projects and, at differing times, operate their computer or workstation in a processing or computing environment defined according to the resource needs/demands of that particular project or show. In some cases, the shell 152 such as provided in a UNIX, Linux, or other operating system 150 may be configured as a REDE shell by configuring the shell 152 to perform a step of looking in the home directory 162 for a REDE engine file 166 and if present, invoking/running the engine to create layer 154. In a shell, the environment may be defined in a number of ways but may include a setting or definition of search paths, variables, and aliases with the paths providing a list of places or pointers to find software or applications (e.g., with program commands controlling which version of the application to provide in an environment), the variables providing names of resources (e.g., name, URL, server to use, web browser, memory, printers, servers, and the like), and the aliases providing short names of commands used in the particular environment.

With the use of the REDE layer 154, the environment management functions or processes are internal to the shell 152 (e.g., not reliant on external subprocesses, command interpreters, and the like to provide environment definitions). When the shell 152 is started in or with REDE 154, the REDE layer 154 dynamically authors itself and accesses the array (not a simple list) of environment definitions 152. A project may provide a main environment then subenvironments may be provided that inherit settings 174 from this main or parent environment (e.g., a show may be the main environment and then there may be a development environment, a production environment, a stage environment, an animation environment, a shot environment, and so on). In some embodiments, the REDE engine file 166 is configured such that the process of creating environments is achieved by recursion with the REDE layer or engine 154 calling itself rather than launching a subprocess (which may be undesirable in some cases as it requires additional memory usage by the kernel 158). The REDE layer 154 may include a suite of commands and/or functions that are sensitive or are performed based on the job state 156 assigned to the shell 152 (e.g., the shell's context). In some embodiments, a system level resource file provided on each workstation (e.g., a Linux, UNIX, or similar system) is altered to instruct the shell 152 to search for the existence of the REDE engine file 166 in the user home directory 162 and to execute the instructions/commands found therein (e.g., to produce the REDE layer 154 about or within shell 152).

To further clarify, an REDE shell according to the invention, such as shell 152 in FIGS. 1A and 1B, differs from an ordinary shell (such as a common C-shell, T-shell, or the like). A full suite of commands and functions are added that facilitate the workflow and enable a user to quickly change their environment, e.g., change their environment as their work changes. This allows the user to move quickly and smoothly between toolsets and/or sets of computer resources such as for differing project or shows and even for differing shots or portions within a project. For example, a user will not have to request an IT administrator provide them with a different version of a software tool because the proper tools are associated with each project by use of job states and environment settings or definitions that are associated with each job state and the user can command its workstation or the environment on the workstation to configure itself (e.g., by changing the job state value).

In this discussion, a shell is generally an interactive command interpreter for the system kernel. In a UNIX system, a C-shell or T-shell is typically provided to allow a user to communicate with the kernel. For example, when a user types in commands in a user interface such as at the prompt using a keyboard in a text window, the user is using a shell to tell their computer or workstation to perform a task or function. The shell interprets the commands, translates them to statements understood by the kernel, provides them to the kernel, and the results are translated and presented, in some cases, back to the user. The kernel is the program that runs on a computer, which can be though as the heart of the OS software (e.g., is a portion of the operating kept in memory at all times and that encapsulates elementary functions of the system). Shells are common in UNIX or similar systems but are also used in Windows-based systems, in MacOS systems, and other OS-based systems. The shell is considered a shell, in part, because it is wrapped around the kernel. The present invention is not limited to a particular OS or to a particular shell arrangement (e.g., applies to C-shells, T-shells, Korn shells, bash shells, Bourne shells, and other shells).

Further, it may be useful to state that generally a variable may be a memory location that is used by the shell or the computer system to store information. A variable typically has a name that allows the shell to reference the variable and a value that is the information stored at the memory location. In most shells, there are at least the follow two types of variables: environment variables and shell variables. An environment variable may be thought of as a variable whose value is passed on from process to process. When an environment variable is set to a specific value in one shell (e.g., using the "setenv" command), the children of that shell inherit that variable from the parent shell. A shell variable generally exists only in the shell in which it is set (e.g., using the "set" command) and child shells do not inherit the values of the parent's shell variables. An alias (also called a "command alias") is generally thought of as a nickname or short name for a longer and/or difficult to remember command and may be set using the "alias" command. Aliases, in some embodiments, are like shell variables that are not passed on to child processes, but, they may be included in the environment settings or variables that are provided in the array of environment definitions (e.g., in a Master Environment Index or similar file provided for each job state) for use in defining a particular computing environment. Paths may also be provided in the environment variables or settings provided in the environment definitions (or in the Master Environment Index file), and path in this case generally refers to a list of places the shell will look for the commands that the user will be able to use in a particular computing environment. The path variable, in some embodiments, is a list of different directories that the shell searches to find the programs that the user can run in the environment.

The following discussion describes how job states are defined within some embodiments of the invention, such as may be utilized in the system 100 of FIGS. 1A and 1B (e.g., with the array of environment definitions including a plurality of master environment index files for each job or job state). The actual content of any given job state is typically defined by a group of resource files that are executed by the shell. These files can be changed explicitly by creating and/or modifying the master environment index for a particular job state. The REDE layer in a shell includes a command to specify the environment definitions for a particular job state, and this command may execute a script allowing the user to edit the file within the environment for the current job state within the master environment index (e.g., to set or modify an environment definition for a job state via a user interface provided on a monitor of their system such as a text window, a GUI, or the like).

In some embodiments, the master environment index is a file that is unique to each job or job state (such as for each job in a hierarchical tree or job tree). The file defines the necessary environment settings for the entire job (or project or upper level or tier). The job or project may be broken down into subprocesses or subprojects corresponding to lower tiers or levels in the hierarchy below the job. In an animated film implementation, under a job, each sequence (or seq) and shot belonging to that job may also be defined within a master index, and a master index can be saved in memory with every shot as it is archived so as to provide a comprehensive snapshot of all the used resources for the each shot. The master environment index is used each time that a job state change results in a change in environment settings. A change in job state that does not require any environment changes typically will not reference the master index.

Prior to the execution of the master index, the REDE engine or layer executing in a shell removes all the settings associated with the original or old job state. This is accomplished, in some embodiments, by removing all environment variables not contained in a raw or default state file or definition for the user's computer system, which has the effect of unattaching from all collections or packages specified by the previous job state, removal of all aliased commands created by that job state, and unsetting any environment variables or path setting that were specified in the master environment index file for that old job state. Then, the sourcing of the master environment index for the new job state causes all of the settings of the target job state to be invoked, which results in performing any attaches or implementing aliases that may have been defined in the master environment index file and in assigning environment variables as contained/defined in this file.

As discussed, each new environment is defined through the used of an environmental definition file stored in an array of such files, and these may be labeled master environment indexes or simply master indexes. Each master index may be implemented as a comprehensive resource script (e.g., a C-shell resource script or the like) that defines the environment settings for an entire job, productions, or project. Each job may have its own master index, which contains the complete information needed to configure a user's environment for any part of the job. For example, any shot in an animated work can be archived along with a copy of the master index file and, upon retrieval, all necessary information required to configure that shot will be available as well. To this end, there are preferably individual files stored in memory that correspond to each aspect of the job state setting, and when any portion of that job environment is modified, the master index is recompiled to reflect the change. When a change environment command is invoked, a series of dialog messages (or other techniques) may be used to prompt the user to change the current job state, and, in some preferred embodiments, only the bottom layer of the current job state is subjected to the changes. Hence, job-wide settings are only imparted by making the current job state the upper most level prior to making environment setting modifications.

Figure 2:
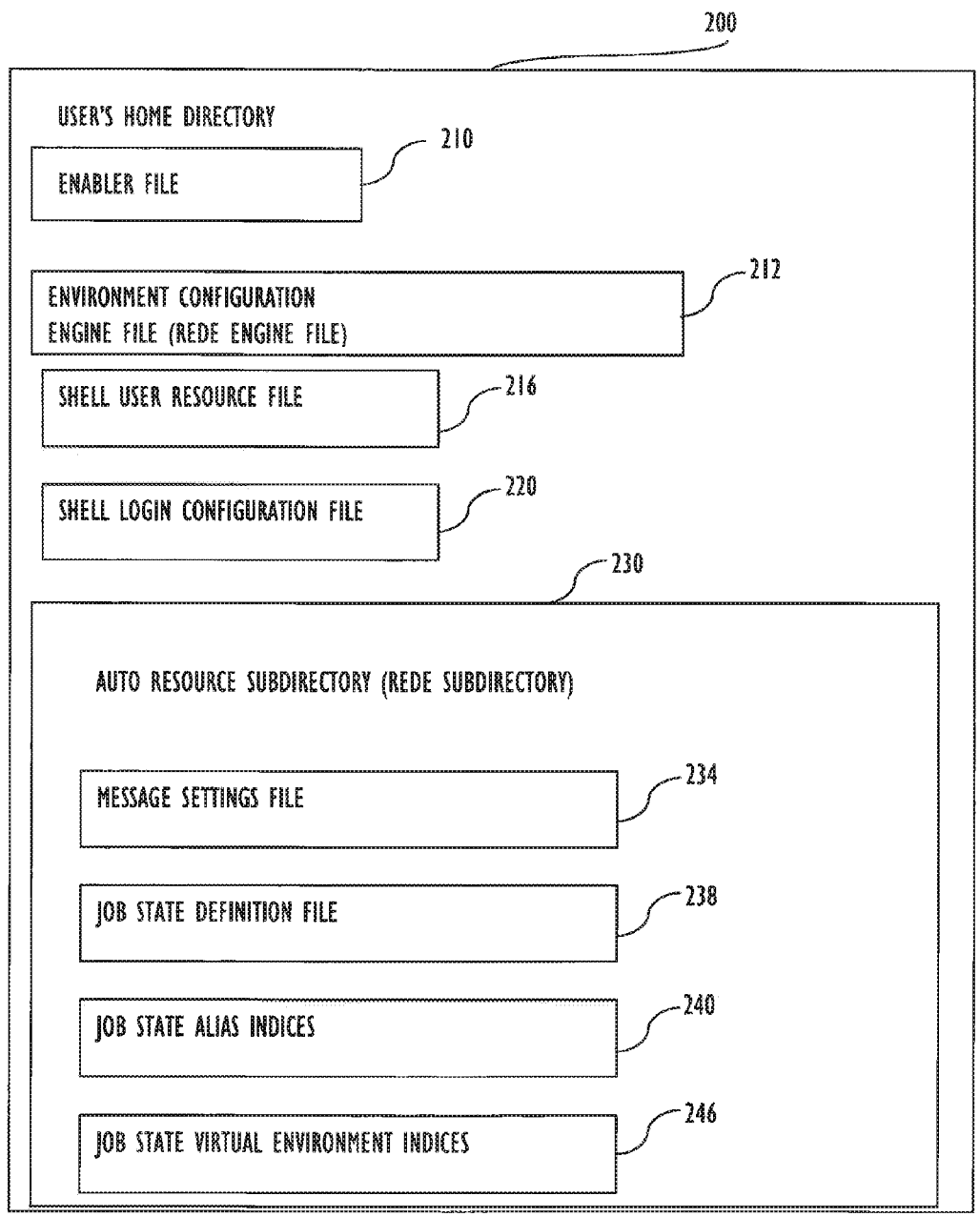
FIG. 2 illustrates one arrangement of a set of files provided in a user's home directory as may be stored in memory (e.g., a hard disk or the like) of a user's computer system to facilitate management of processing environments.

FIG. 2 illustrates a home directory 200 as may be provided for a user's home directory in the memory of a user's computer system or workstation (e.g., for system 140 of FIGS. 1A and 1B). The behavior of any user shell account is determined by a series of resource files contained in that computer system user's home directory, and, to implement an environment management method and system of the invention (e.g., the REDE method or environment), additional files are provided in the user's home directory 200 as shown in FIG. 2. These files include information to perform at the following two functions. First, the files change the startup behavior of the standard shell so that the REDE or management environment is initialized. Second, the files provide runtime support for all of the REDE or environment management command set.

The enabler file (or REDE enabler file) 210 is placed in the home directory 200 to indicate to the user's computer system that the user is a user of the management or REDE engine. When the enabler file 210 is present at shell opening, the system executes the environment management or REDE startup action. The environment configuration engine file (or REDE engine file) 212 provides the environment management functionality described herein (e.g., is the REDE engine when invoked). It may be provided as a single executable shell script file that performs all of the REDE or environment management functions. The engine file 212 is self-installing and self-updating in some embodiments. The shell user resource file 216 is a file that is executed by the shell at the time of startup. It is used to define specific environment settings. The file 216 is owned by the user's account, and a user in some embodiments is allowed to place commands in this file 216 to provide specific functionality and customize their environment. Similar to the resource file 216, the shell login configuration file 220 is executed when the shell is created by login activity (e.g., physically logging into a workstation, logging into another machine remotely, opening certain kinds of new shell windows, and the like). This file 220 also may be modified by the user, in some embodiments, to add customizations to the login functionality of their system and/or working environment.

In practice of some embodiments of a REDE-based system, the autoresource subdirectory (or REDE subdirectory) 230 is installed the first time a REDE shell is opened by a new REDE account. The subdirectory 230 contains files that are created and modified by the REDE engine or layer in the shell during the course of normal operations. The activity in this subdirectory is in most embodiments automated, and a user typically does not make changes to the files in this subdirectory 230. The message settings file is used by the REDE engine to determine the level of debug output, and, in one embodiment, this file contains a single digit numeral (e.g., 0 to 7) that identifies the relative "wordiness" of the REDE engine during shell activity (e.g., the verbosity level provided by an invoking shell during troubleshooting of command line issues and the like).

As discussed above, in implementations of a REDE engine or REDE shell, the condition and behavior of a user's environment is controlled by the assigned or associated job state. The job state is defined by specific environment variables, whose values are set at user login. The job state definition file 238 is used to store the job state and is regularly changed and read by the environment as the user uses the corresponding shell, and, as such, it is owned and is writable by the user's account. The job state definition file 238 is written and read automatically during system operation.

Further, because the REDE layer or engine of a shell, manages a user environment through a number of different job states, it is desirable for the shell to keep a record of the aliases that are a part of each job state. While environment variables are inherited by all shells and, thus, are passed on to every shell a user uses, aliases are not passed on to shells. The aliases that are part of a user's environment in each job state are recorded in the job state alias indices files for reference whenever they may be needed. The job state virtual environment indices files form a "snapshot" of the user's startup environment and are provided, in some embodiments, to improve shell startup performance. The file 246 is typically executed whenever a new shell is opened by a user's account. It may also be automatically updated whenever the settings for the corresponding job state have been changed at the central repository (and, in some applications, may be re-authored such as when a restate command or the like is invoked).

The ability of environment management engines (or REDE engines) to function to determine and to change environments to match or based upon job states is a useful part of the invention, and it is likely worth discussing in much further detail to fully understand the breadth of the ideas explained herein. The job state is used to identify a user's environment settings, associate the user's environment with a particular work area, and to reference a particular piece of work. The notion of a persistent, workspace-defined environment is one of the motivating design features of embodiments of the invention. The purpose of such an arrangement is to provide a way for multiple users to work within the confines of a particular task while insuring that the computing resources used by each of these users is substantially similar or even identical. The notion of associating software, hardware, networking, and other computing resources with the work to which it is applied has other benefits as well (e.g., in an animation implementation, archived shots may retain a fingerprint that defines the tools needed to correctly manipulate the material contained in them). Users are able to work on differing portions of a project or job (e.g., work on different shots), even different projects (e.g., different jobs or shows), quickly and easily on the same or different computers or workstations by changing between environments associated with these differing portions of projects or differing projects.

The job state may be thought of as the reference point used by the REDE or environment management engine to establish a user's environment setup, manage the user's software and other computer resources, find the user's work files, and, in some cases, influence the behavior of particular commands. The job state is typically defined by a series of environment variables. These variables are used to define three primary attributes (i.e., the aspect, the scope, and the mode), which describe the job state of each REDE shell. These three attributes serve to define the job state in each of the ways useful for managing a user's computing environment. The aspect defines the material to which the job state applies, the scope defines the persistence of that job state, and the mode defines the version of the environment that will be used in that job state. The following discussion explains these attributes for use in an animated film implementation, but those skilled in the art will understand these concepts can readily be applied to other settings involving multiple users sharing a set of computer resources and working on a plurality of projects.

In one embodiment of the aspect attribute, there are three primary and two ancillary aspect variables that serve to define the job state. The primary aspect variables include job, seq, and shot with "job" corresponding to the production or project (e.g., a code name or shortened version of a production or project name), "seq" or sequence corresponding to the sequence within the production, and "shot" corresponding to the actual shot or scene within the sequence. These variables define the aspect of the job state, and they are typically unique to each individual job state. In other words, each job state represents a discreet environmental condition that is predicated on the aspect of that job state. In practice, a job state may be referred to by its aspect, e.g., "my shell is in the PROD1 07.0 025.00 Job State." These primary variables are generally always defined within a REDE shell, even though they may be empty such that a user may be in a job state that only has a job value while the seq and shot variables are defined but are null or the empty set. The two ancillary aspect variable that may be part of a job state aspect may include the department or dept variables and the area variable, and these variables do not have to be defined (e.g., are optional) and correspond to the subdivision of work below the shot layer.

Regarding the scope attribute, the scope of a job state determines when the job state will be used. The scope may be permanent or temporary. A permanent job state is assumed by all shells forming as new shells (e.g., no parentage such as a login shell), and it may be thought of as a default or startup job state. A temporary job state is applied by default when any job state change command is invoked (unless another scope switch such as "-perm" is included in the command). In other words, changing the job state typically is temporary unless the user specifies otherwise. A temporary job state is in force only in the invoking shell and its child processes. A child process inherits the job state of its parent process, and, hence, it does not matter what a user's permanent job state is because when a child shell is created it assumes the job state of its parent.

The mode attribute of a job state is essentially a reference variable that describes which master environment index will be used to interpret the aspect of the job state. It defines the version (or flavor) of the job state requested. The job state mode may have a number of values. Production or prod may be the default mode that corresponds to the normal production version of the environment. Development or dev may be a value used to refer to the show-defined "test" version of the environment. The stage value is the new mode that is intended to become the next "test" version of the environment in some future incarnation. The old value for mode is given to a job state that is the show-defined "old" or "last" version of the environment. The mode of any job state typically remains unchanged as long as the job variable remains unchanged. In other words, once a user has invoked the "dev" mode for a particular production, the shell remains in the "dev" version of that environment even though you may change seq or shot values underneath that production. If a user changes the job value of a shell's job state, then the mode defaults to "prod" unless otherwise specified in the command.

During implementation of the environment management methods described herein, there is provided a relationship between a body of work or a project and the job state. Because of this relationship, a homogenous workspace definition is typically provided to facilitate functioning of the REDE engine or layer in the shell. In one embodiment, this is achieved by implementing a particular workspace directory architecture. One useful architecture or structure is shown the job tree 300 in FIG. 3, which is representative of the uppermost portion of the workspace directory architecture. The job tree 300 is shown as it may appear with sample data filled in corresponding to a set of exemplary job state variables 310 (e.g., with job states 312, 314, 316 with values "tech", "awsm", and "bigtest." Each job state has a corresponding file 330, 332, 334 stored in memory at unique paths 320 shown at 322, 324, 326. In this illustrated example tree 300, the job variable is "tech", the seq or sequence variable is "awsm", and the shot variable is "bigtest."

As shown, each job state 320, 332, 334 has a corresponding path 322, 324, 326 inside the job tree 300. In this way, the workspace may be thought of as defining the job state. In some embodiments, the mechanism that assigns the job state variables to the shell defines such variables that have matching directories within the job tree 300. In other words, a user typically could not set themselves up in a job state for a shot that did not exist. The actual setting of a job state is explained below, but it should be pointed out that the job state corresponds to an actual location where the work belonging to the job state resides in memory. The REDE layer or engine through its use of job states is primarily concerned with the work and data directories 336 and 340 in FIG. 3. In the new workspace paradigm, it is typically within these directories 336, 340 that actual work will take place and digital assets created and stored. The pix directory 342 is primarily for completed frames or raw scans while the inter directory 338 is a storage location for intermediate elements during the production process.

Figure 3:
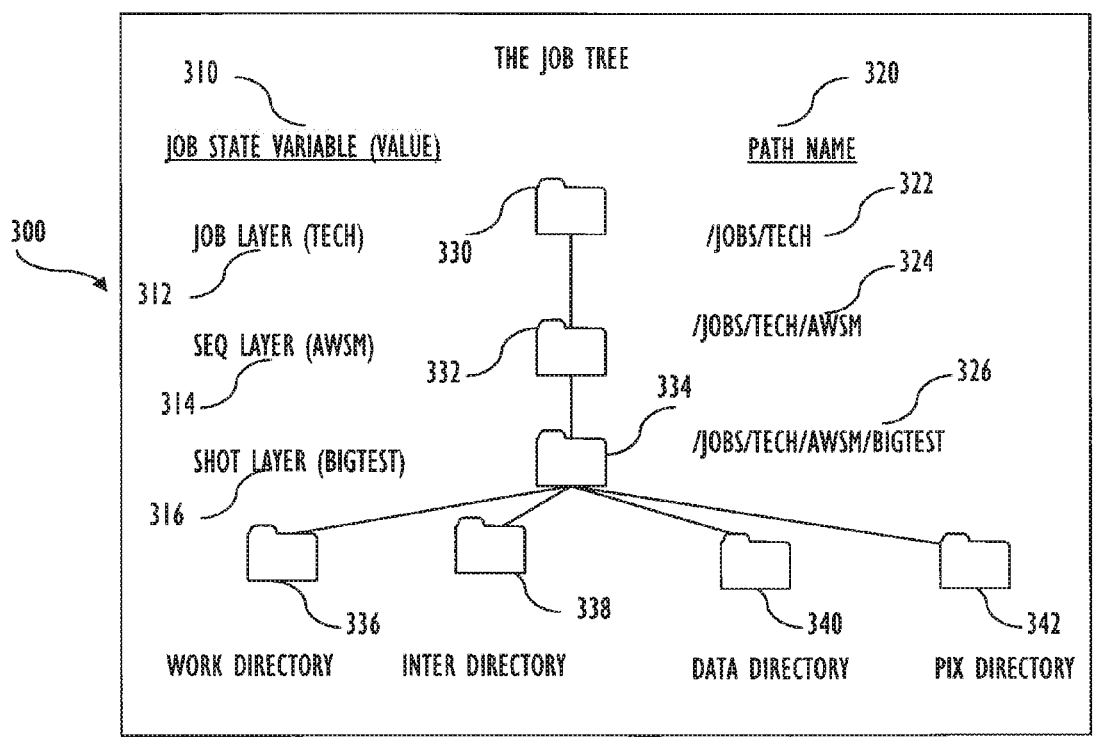
FIG. 3 illustrates a simple form of the hierarchy or tree structure provided for the job states in an environment management method of an embodiment of the invention.
Figure 4:
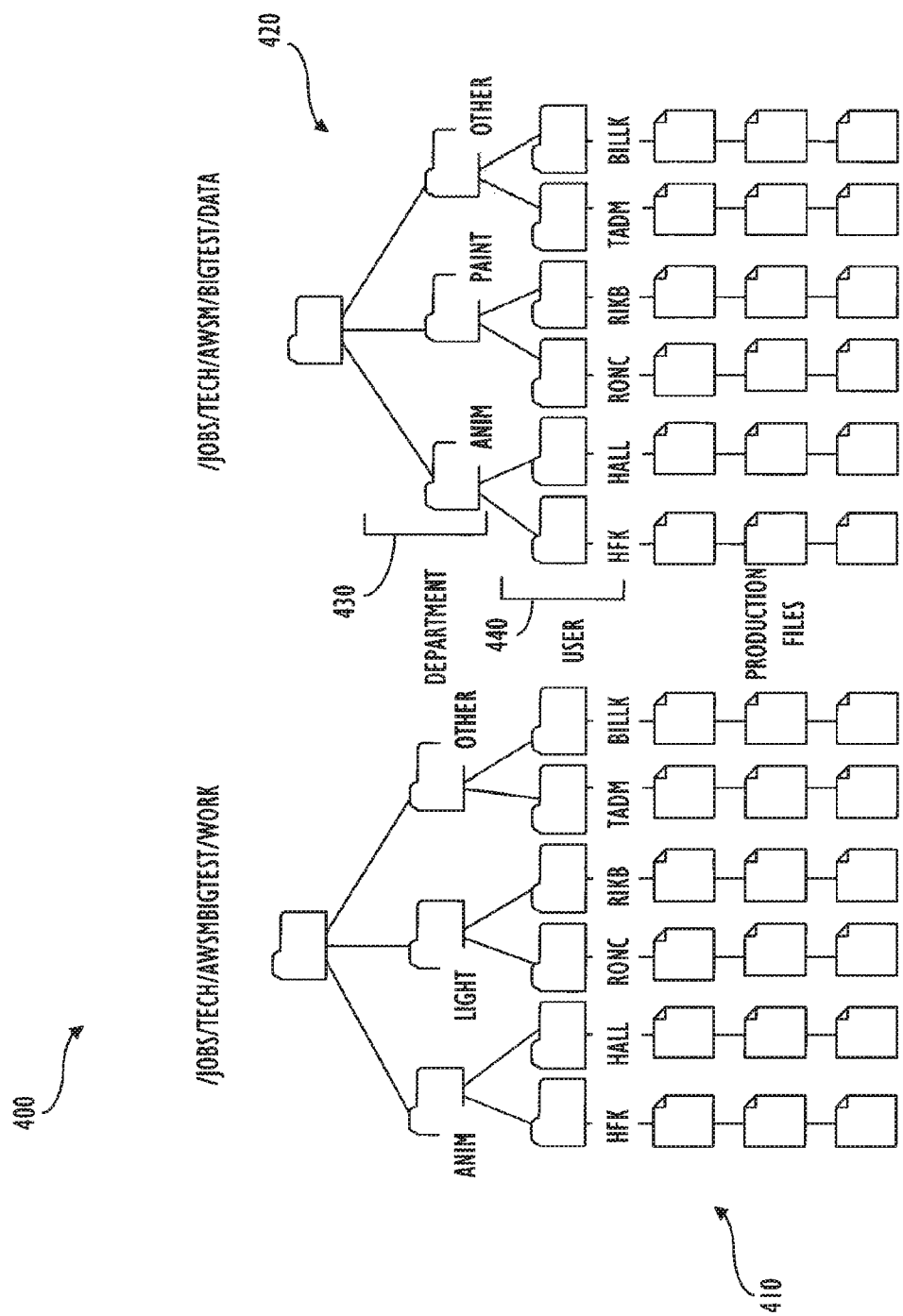
FIG. 4 represents distribution of files within exemplary work and data directories, which may be provided in the hierarchy or job tree of embodiments of the invention such as the job tree shown in FIG. 3.

FIG. 4 illustrates a representative distribution of files 400 within an exemplary work directory 410 and data directory 420 (e.g., such as may be implement in the job tree 300 of FIG. 3). The distribution 400 is interesting, in part, because it shows the department directory layer 430 and the user layer 440 that are provided below the shot level. These layers 430, 440 are significant in differing ways. The user directory layer 430 is intended to provide a method of indexing, which can be used both by a Unix or other operating system environment and by other users to determine the location of work files. The REDE layer or engine knows the username of each shell user, and, when the job tree of a particular show is set as illustrated in FIGS. 3 and 4, navigational commands are built into the REDE layer to assist the user (e.g., to provide an interface to the distribution of files 400). The department layer 430 may be a part of the job state definition (e.g., through an optional department or dept variable provided in the job state definition). FIG. 4 does not illustrate an area layer that is an optional directory below the department and user layers 430, 440. The area directory can be used for storing data or assets associated with a production that does not readily fit into the other layers such as items a production has decided to define in administering the construct or workflow of a given shot or the like.

During use of a REDE-based shell, it may be desirable for a user to recognize or determine their current or the existing job state. A variety of methods may be provided in systems of the invention to allow a user to determine their system's job state. For example, the default window (or their user interface) that is displayed on their monitor may include a title for each generated REDE shell, and this may be or include the job state of the shell. In one particular example the title may read "3.0_beta2 tech nsqt shot1 (anim) {dog}." In such an example, the value of the user's job variable is "tech", the seq variable is "nsqt", and the shot variable is "shot1." Further, the user is working in the "anim" dept on the "dog" area. In this case, the department and area settings appear in parentheses to set them apart from the other variables, but this is not required. Another way to determine the job state of a shell is to use a selected or typed command (e.g., a built-in command provided in the REDE layer or engine of the shell) such as a "show" command, which may function to cause the job state variables to be displayed. The show command may also indicate whether the job state is temporary or permanent.

The architecture of the job state within the REDE layer or engine is hierarchical in some preferred embodiments such as in a way similar to the matching file system to which it corresponds. In other words, the sequence variable from a job state may be provided as a part of the job portion of a job state in a similar way that the sequence directory is contained within the project directory. In practice, a user first acquires an environment of a particular job or project before the user acquires the environment of a sequence. Similarly, the REDE shell is configured to put the sequence or seq settings in place before it applies the settings of the shot (e.g., the environment settings of the job layer of the job state may be thought of as being the general settings inherited by lower levels of the job state such as the sequence settings (or shot settings and so on) that can be used to add groups of special or more particular settings for an environment). This preferably all occurs automatically when the REDE layer or engine is configuring a user's job state.

Figure 5:
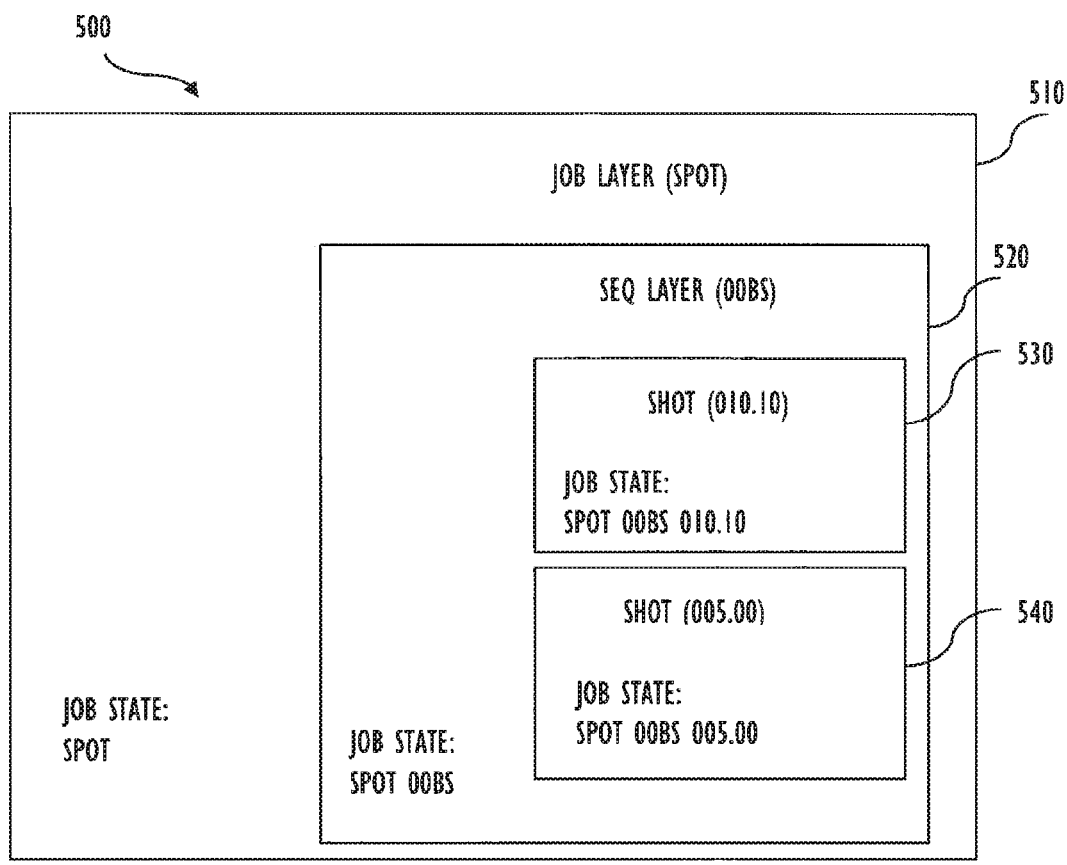
FIGS. 5 and 6 illustrate exemplary job state hierarchies that may be established through the use of differing environment settings at various levels of a job or project.

FIG. 5 illustrates the hierarchical nature 500 of a job state for an example shell. As shown graphically, the job state hierarchy 500 includes an upper (or outer) job layer 510, an intermediate (or first inner) sequence layer 520, and a pair of lower (or second and third inner) shot layers 530, 540. As shown, each shot 530, 540 is contained within the sequence 520, which in turn is contained within the job 510. To get to any shot area 530 or 540 from the outside, a user must pass through both the job layer 510 and the sequence layer 520. In many implementations of REDE shells, the environment definitions given for a project (or production) may remain the same throughout the entire project or production. In practice, this results in the environment settings being defined or set at the job layer 510, and the lower layers 520, 530, 540 do not significantly change the environment a user is working within by operating their computer or workstation.

Figure 6:
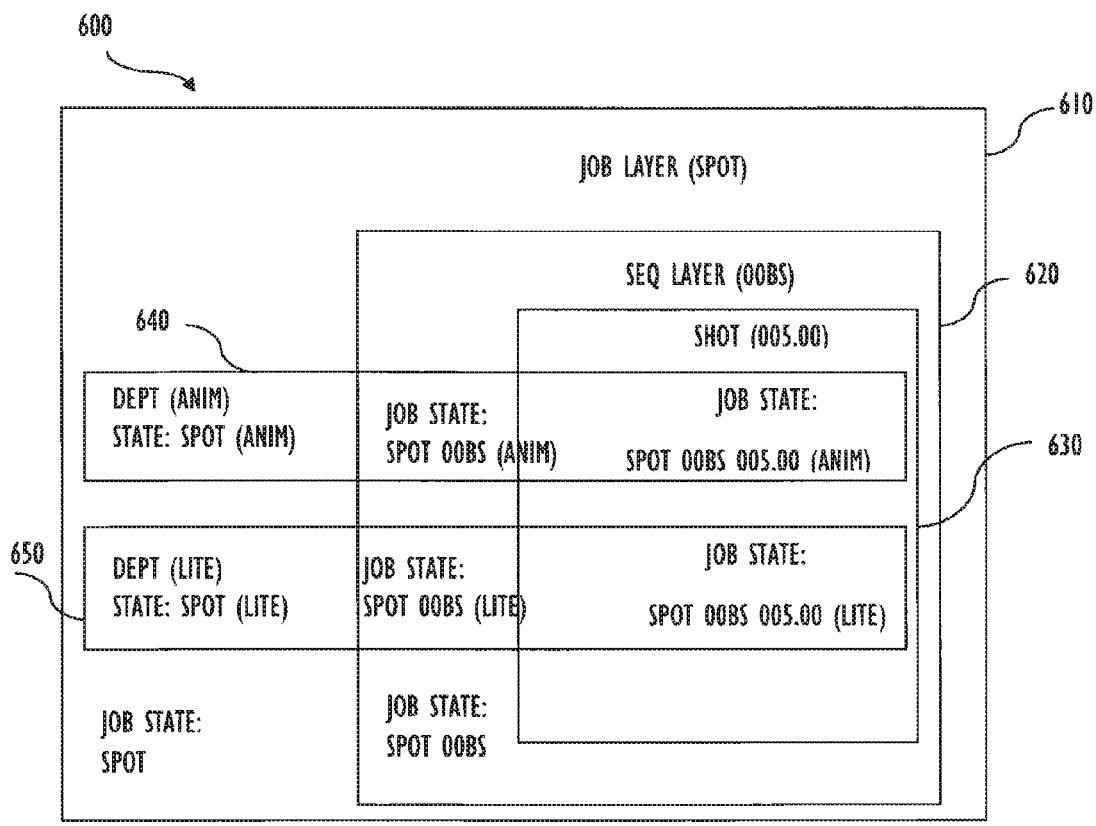

As mentioned above, the department or dept variable is optional, but, when it is defined, the REDE layer or engine recognizes it and uses it in all or most aspects of the job state. FIG. 6 illustrates a job state hierarchy 600 for a particular user's shell that is used to create a particular processing environment. As shown, this hierarchy 600 includes a job layer 610, a sequence layer 620, a shot layer 630, and also two nested department variables 640, 650 that affect job states in the hierarchy 600. The department variable may have any arbitrary value as it is not typically required to conform to any part of the job tree. This is useful because administrators of a project or production may want to define specialized departments and assign a unique or specialized resources to such departments, and the use of departments 640, 650 provides a great deal of flexibility in defining a job state hierarchy 600.

As shown in FIG. 6, the department or dept variable is influential at each layer of the job state 600. For example, each subordinate layer of the job state 600 can have a discreet and possibly different department environment configuration. Each department variant 640, 650 of the job state 600 is a member of the "parent" job state and job layer 610, but each does have the option of harboring its own environment settings. For example, in FIG. 6, the job state of the animation department 640 is within the scope of the upper job state (or job layer) 610 such that for the department 640 environment settings to be applied the outer layer settings for layer 610 are put into place first. Also, the REDE engine or layer of the shell constructs the lighting department 650 job state by first applying the parent job layer settings 610 (or the parent job state), the sequence layer 620 settings, the shot layer 630 settings, and then the department 650 settings (and, typically, in that order). Hence, each department that is configured for a particular project can have its own environment specifications, tool sets, and other computing resources automatically applied on demand by selecting and/or changing to a particular job state. Again, the layers or subdivisions of a project are discussed with relation to an animated film but the techniques may be applied to nearly any subdivision of a project, organization, or entity that shares computing resources among a number of users.

The job state is used to define or determine which environment settings are applied by a user's shell or shells. These settings are contained in memory accessible by the user's computer system or workstation (such as via a communications network). The settings may be contained or provided in one or more files. In one embodiment, an organization provides a special file that may be labeled a master environment index. Each project or job may then have its own master index file that defines the environment settings for each job state that is part of that particular job or project. In some implementations, a user may issue a command understandable by the REDE layer or engine to view the settings provided in the master index file such as with a showstate or similar command that causes the computer to display the environment settings corresponding to the job state of the shell running the REDE engine (e.g., of the job state in which that shell was invoked by a user). The settings in such cases may be displayed in a text window or other interface on a monitor such as by layer in the hierarchical fashion coincident with how they are applied to create an environment.

In some embodiments of environment management systems of the invention, the environment management or REDE engine is adapted to take advantage of the job state concept and to facilitate use of features of the created environment. Specifically, the engine is provided with a command set that may be built into the REDE engine architecture. In some cases, these commands are provided as aliases that are created in every or many REDE-based shells. The following paragraphs explain exemplary commands and their use during operation of the REDE layer or engine.

There may be a number of built-in tools or commands that are not related to the particular job state settings (whereas most REDE commands discussed below either depend on the job state for their function or influence the job state when they are executed). A command such as a get application command may be provided to add path, library, and other information/variables to the environment for that application that is provided as the argument for the command (e.g., Houdini, Maya, Mathematica, or other applications in an animation project). Another command may be provided to remove application-specific environment settings from a user's environment (e.g., an unget application command or the like). A command may be provided in the REDE engine command set to allow a user to request a display of a list of the REDE command aliases defined for the particular environment. Also, a command may be included to change or write a title to the text window or user interface window (which may be overwritten by default titles when the shell is changed such as by changing job state).

One of the advantages to having a job state-sensitive environment is that it becomes possible to automate a number of otherwise tedious tasks, and, with this in mind, many embodiments of the invention include a number of built-in commands that are tools that use the job state settings. The following informational commands may be included in the command set: a show command to display current job state settings; a job list command to list all values of the job variable; a sequence list command to list all the values for the sequence variable; a shot list command to list all the values of the shot variable; a department list command to list all the values of the department variable, and a window command to set the title of the current shell window to correspond to the current job state setting. The command set may also include a number of navigational commands such as the following: a go to job command to navigate to the top of the user's job directory within a job tree (and then list the pathname and contents of that directory); a go to sequence command to navigate to the top of the user's current sequence directory within the job tree (and then list the pathname and contents of that directory); a go to shot command to navigate to the top of the user's current shot directory within the job tree (and list the contents of that directory); a work command to navigate to a user directory, if present, within the department directory under the work directory corresponding the user's current shot (if no department directory exists, the user may be navigated to the work directory instead); and a pix command to navigate to the user directory, if present, within the department directory under the pix directory corresponding to the user's current shot. As will be appreciated, these commands depend upon the job state settings to function, and these commands are, at least in some embodiments, the primary implementation of the job state in terms of navigation and information gathering. In this manner, the job state not only affects the environment settings of a user's shell, but the job state also influences the way the REDE command set functions.

The act of changing job state is another important part of some REDE system implementations. The ability to make such adjustments, including creating new environments with each change of job state, quickly and easily is a significant part of the design motivation of the inventor. In practice, each time a user sets (or re-sets) their job state, the REDE layer or engine of a shell performs a series of checks and processes in order to establish the correct environment for the new job state. A user typically simply has to know the name of the job state they wish to use or assume and tell the REDE layer (or shell using a REDE engine) to go get the job state. This is accomplished in some embodiments by use of the following REDE state change commands: a job command that changes the job state at the job or upper layer (with an argument of the name or code for the job); a sequence command that changes the job state at the sequence layer (with an argument being the name or code associated with a sequence within the current job or project layer); a shot command that changes job state at the shot layer (with a name of a shot being the argument within the current sequence); and a restate command for setting the job state of the invoking shell to the current permanent job state. Each of these commands generally results in the new settings associated with the specified new job state being applied immediately upon invocation of the command. These commands may also support one or more mode switches, too. Also, as discussed above, the directory that corresponds to the job state the user specifies in the argument of these change state commands has to exist for the job state to be valid and for these changes in job state to result in the generation of a new computing environment. Other commands, such as a restate command may be used to restore the shell to its startup job state.

Figure 7:
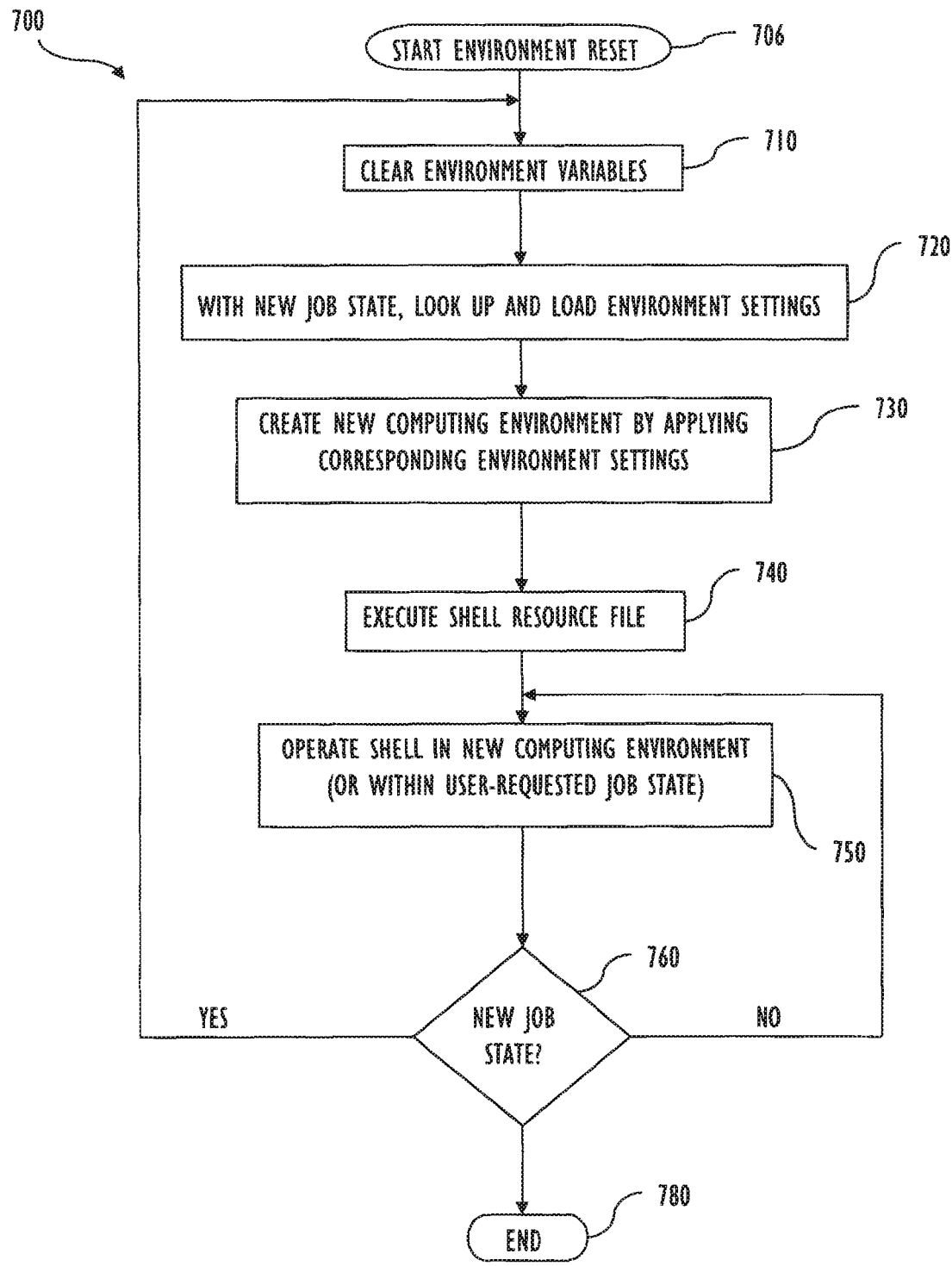
FIG. 7 is a flow chart of a method of changing and/or creating a computing environment upon receiving a definition or selection of a job state from a user.

FIG. 7 illustrates the processes 700 (e.g., a computing environment management process) performed by a user's computer system during a change from one computing environment to another such as when they move from one job state to another job state (or initially logon). The method 700 may start at 706 when a user operates their computer to invoke one of the state change commands discussed above. At 706, the user specifies a job state to be used in creating or defining a new computing environment. At 710, the user's shell removes or clears environment variables, such as all but a set of essential environment variables. This step 710 effectively places the shell in a virtually new condition. The shell, such as by operation of the REDE layer or engine, acts at 720 to look up all the settings that belong to or are associated with the user-specified, new job state. This may involve accessing a stored array to find the master environment index file associated with the particular job state. In some embodiments; the REDE layer or engine has the ability to load the environment settings from a cache file. If the cache file is newer than the master index file that contains the job state definition, the cache file is used to apply that job state to the shell at 730.

In step 730, the REDE layer or engine is used to create a new computing environment by applying the environment settings corresponding to or belonging to the new job state. As noted, this may be done with a cache file or if the master index file has been more recently edited/changed, the action 730 may require formal application of the environment by using attach functions or the like. After applying the new job state environment settings, the REDE layer or engine functions at 740 to execute the shell resource file. This causes the user's customizations to be applied to the user's shell. In practice, this typically means that the user can change the settings that are part of the job state to customize their computing environment. At 750, after the state change operation is executed, the shell is ready to function within the new job state and corresponding environment (e.g., with the resources associated with that job state). The method 700 continues at 760 with a determination of whether the user has requested a new job state, and, if so, the method 700 continues at 710. If not, the method 700 continues at 750 in the current or existing job state and environment. The method 700 may also end at 780 such as by a user exiting the REDE/shell application or logging off of their account or the like. The state change commands are typically effective immediately with the process 700 being implemented but only in the invoking shell. Existing shells will generally retain the environment settings they had prior to the state change command.

During the establishment or resetting of an environment 700, the process can be summarized as involving clearing the environment variables and restoring a base environment. The master index is accessed/retrieved using the job state or an identifier for the user's state, and then the master index file is started or applied to initialize the computing environment associated with the particular job state. This may include installing one or more applications or tools such as a graphics program, a word processing program, and the like with each being implemented with a particular version. An attach list may be processed to further define the computing environment such as by setting paths (e.g., normalizing path variables or the like) and providing aliases (e.g., applying command aliases or the like).

It should further be noted that the above examples have generally stressed that the methods and systems may make use of a file in the user's home directory. While this is indeed a useful feature in some REDE implementations, it is not a required characteristic of the general implementation. In some embodiments of the invention, an REDE implementation is created in a compute regime that does not use home directories such as in a computer regime or system in which an individual user's environment management engine and cache files are stored locally or stored centrally. In other words, some embodiments of the invention are executed in a compute regime in which individual user accounts have the means to permanently store data (whether in a home directory or otherwise in some collective storage medium). Other embodiments function in a volatile memory environment, where all or some users start in some default job state and may only temporarily change states in the course of their login session. In these examples, the REDE engine file may be centrally stored in a read-only context, for example, and no home directory would need to be present.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for managing a user's computing environment on a computer device or workstation, comprising:
   storing a plurality of files in a memory device of a server linked to a communications network, each the files comprising data defining a distinct computing environment;
   storing, by the server, a plurality of applications, wherein the plurality of application include multiple versions of at least one application of the plurality of applications, each of the applications and versions being associated with at least one of the distinct computing environments;

providing, by the server, an environment management engine in a user home directory accessible by the computer device;

operating a processor to run a shell in the computer device;

invoking, by the shell, the environment management engine by accessing the user home directory;

determining a job state for the computer device from a plurality of job states stored in the memory device, each of the job states corresponding to a task within a project performed through operation of the computer device, wherein the determining is based on an indication, provided by a user, of the task; and providing, by the environment management engine, a selected computing environment in the computer device based on the data defining a distinct computing environment in one of the files in the memory device, wherein the providing comprises:
- selecting the one of the files from the memory device based on the determined job state,
- generating the selected computing environment, the generating comprising loading and executing one or more environment settings from the file and further comprising loading each of the application versions associated with the distinct computing environment corresponding to the selected file, and
- presenting the selected computing environment to the user.

2. The method of claim 1, wherein the directory is a user home directory of the computer device and wherein the computing environment is further defined by a set of path variables and a set of aliases.

3. The method of claim 1, and wherein the environment management engine is a self-contained and self-referencing suite of integrated shell command functions.

4. The method of claim 1, further comprising additionally operating the shell to receive and perform a change state command comprising a job state name as an argument, the performing of the change state command causing the shell to access the memory device to obtain another one of the files comprising data defining a computer environment corresponding to the job state name and causing the shell to use the environment management engine to generate a new computing environment in the computer device based on the data defining a computer environment in the another one of the files.

5. The method of claim 1, wherein the environment management engine comprises a suite of commands performed based on the job state and wherein the environment management engine authors itself during the providing step.

6. The method of claim 1, wherein the data defining one of the distinct computing environments comprises values for a set of environment variables and wherein at least a portion of the files are arranged in a hierarchical architecture with parent-child relationships, whereby child files inherit the values of the set of environment variables from parent files.

7. A non-transitory computer readable medium storing program code that, when executed by a processor, performs a method for changing an environment of a computing device, the method comprising:

storing a plurality of files in a memory device of a server linked to a communications network, each of the files comprising data defining a distinct computing environment;

storing, by the server, a plurality of applications, the plurality of applications including multiple versions of at least one application of the plurality of applications, each of the applications and versions being associated with at least one of the distinct computing environments;

providing, by the server, an environment management engine in a user home directory accessible by the computing device;

operating a processor to run a shell in the computing device;

invoking, by the shell, the environment management engine by accessing the user home directory;

determining a job state for the computing device from a plurality of job states stored in the memory device accessible to the shell, each of the job states corresponding to a task within a project performed through operation of the computing device, wherein the determining is based on an indication provided by a user of the task; and providing by the environment management engine a selected computing environment in the computing device based on the data defining a distinct computing environment in one of the files in the memory device, wherein the providing comprises:
- selecting the one of the files from the memory device based on the determined job state,
- generating the selected computing environment, the generating comprising loading one or more environment settings from the file and further comprising loading each of the application versions associated with the distinct computing environment corresponding to the selected file, and
- presenting the selected computing environment to the user.

8. The computer readable medium of claim 7, wherein the environment settings are provided in memory accessible by the computing device and the environment settings are provided in a master environment index file unique to the job state.

9. The computer readable medium of claim 7, wherein the environment settings comprise settings for path variables and for alias variables.

10. A system for managing user computing environments based on job states, comprising:

a client computer system comprising:
- a central processing unit running an operating system,
- a client memory local to the computer system and storing a user home directory including an environment management engine file,
- a shell provided by the operating system, wherein the shell comprises an engine provided by invoking an environment management engine file obtained from a server computer system,
- a distinct computing environment provided by, and presented to a user by, the engine running in the shell based on an indication, by a user, of one of a plurality of job states; and a server computer system comprising:
- a server memory accessible to the client computer system storing a plurality of applications, wherein the plurality of application include multiple versions of at least one application of the plurality of applications, each of the applications and versions being associated with a distinct computing environment, and
- data storage accessible by the computer storing a list of job states, each of the job states being associated with a digital work stored in memory in or accessible to the computer system and further associated with a work area for use in working on the digital work, and storing a file for each of the job states defining environment settings including the digital work and the work area and including a set of the applications and versions defining one of the distinct computing environments, wherein the distinct computing environment is generated by the engine accessing the data storage with one of the job states to retrieve and apply the environment settings in the file associated with one of the job states, and wherein the generating of the distinct computing environment comprises loading and executing one or more environment settings and further comprises loading each of the application versions associated with the distinct computing environment.

11. The system of claim 10, wherein the one of the job states is selected from the list of job states based on the indication from the user.

12. The system of claim 10, further comprising an additional computing environment created by the engine running in the shell, wherein the additional computing environment is generated by the engine accessing the data storage with another one of the job states from the list of job states to retrieve and then apply the environment settings in the file associated with the another one of the job states and wherein the environment settings for the one of the job states and the another one of the job states define differing sets of computing resources.

13. The system of claim 10, wherein the list of job states is arranged with a hierarchical architecture with lower level job states inheriting environment settings from upper level job states.

14. The system of claim 10, wherein the environment settings comprise versions of software applications and the computing environment is created at least in part by installing the software applications in the computer system.

15. The system of claim 10, wherein the environment settings further comprise path variables and aliases and the computing environment is created by applying the path variables and the aliases to the computing environment.

* * * * *